May 7, 1968   K. H. GRIMM   3,382,410
ARCING FAULT DETECTOR
Filed April 13, 1966
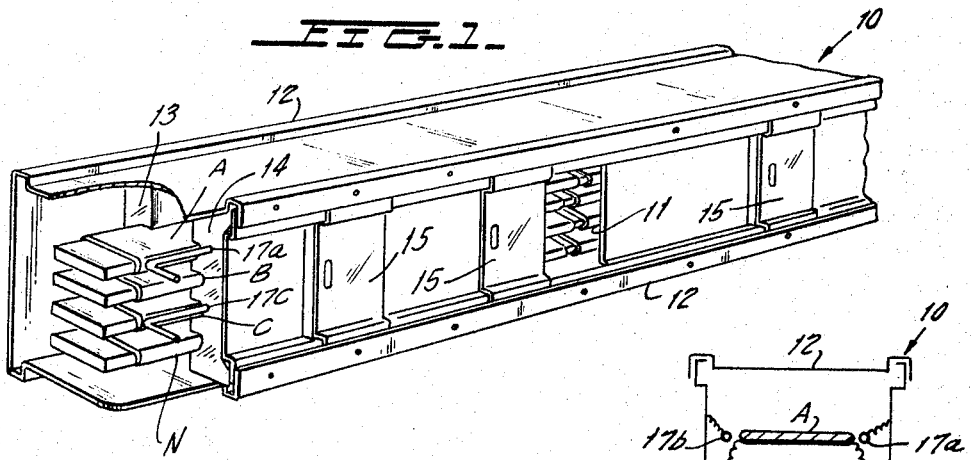
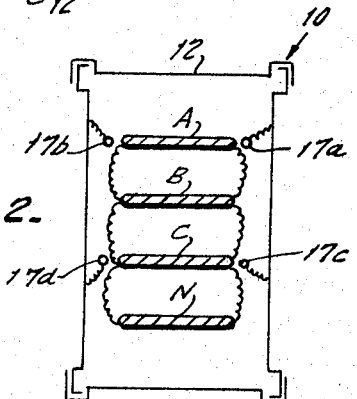
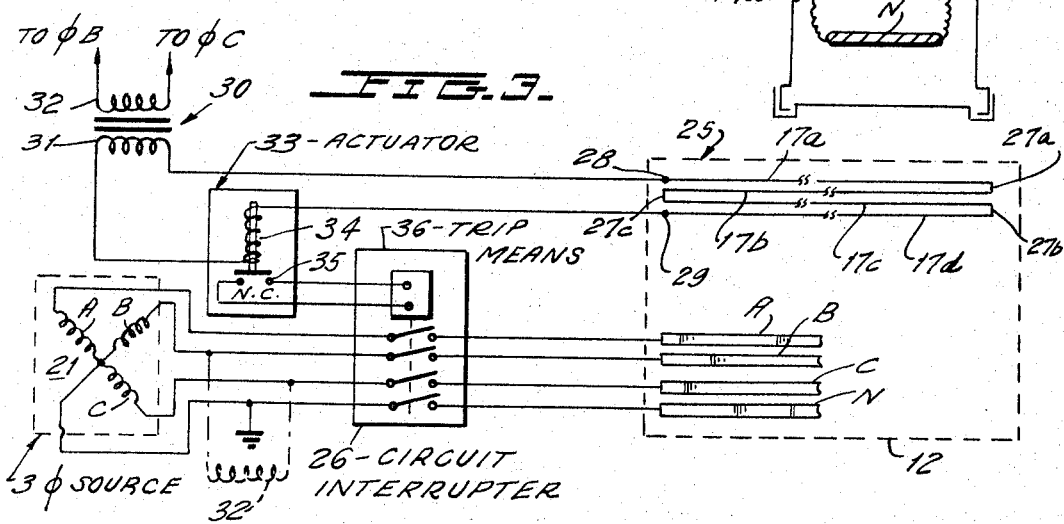
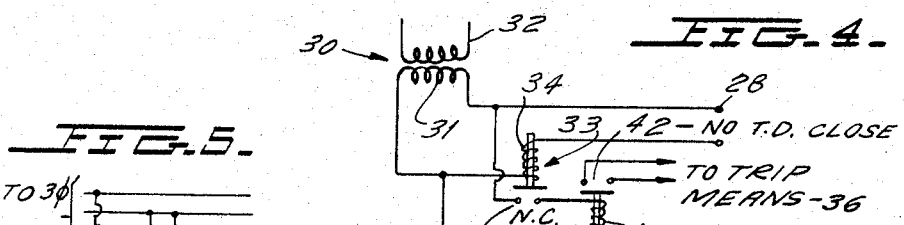
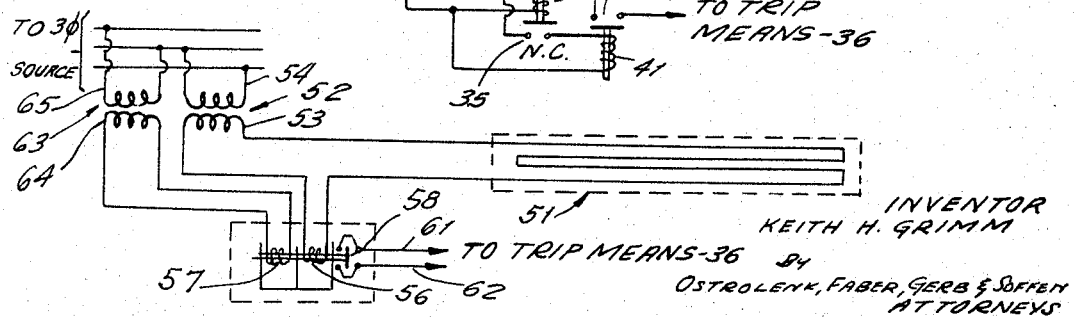
INVENTOR
KEITH H. GRIMM
BY
OSTROLENK, FABER, GERB & SOFFEN
ATTORNEYS United States Patent Office 3,382,410
Patented May 7, 1968

3,382,410
ARCING FAULT DETECTOR
Keith H. Grimm, Detroit, Mich., assignor to I-T-E Circuit Breaker Company, Philadelphia, Pa., a corporation of Pennsylvania
Filed Apr. 13, 1966, Ser. No. 542,290
10 Claims. (Cl. 317—18)

This invention relates to bus duct in general and more particularly relates to means for detecting arcing faults in bus duct systems.

Bus duct of the type described in U.S. Patent No. 2,350,601 issued June 6, 1944, to W. H. Frank et al. for an Electrical Distribution System is designed to carry moderately high magnitudes of current. Accordingly, conventional protective equipment used with bus duct is calibrated to respond to current of higher value than the relatively high magnitude rated current of the duct. Because of arc impedance and ground return path impedance, arcing faults in bus ducts seldom involve high current. Thus, conventional bus duct protective equipment will not respond to, or will not respond rapidly enough to, arcing faults to prevent irreparable damage to the duct.

The prior art has attempted to provide solutions to the foregoing problem by utilizing phase current sensitive devices adjusted for tripping at relatively minor overloading. But this does not provide adequate protection since arcing current levels may actually be less than the normal load current. Further, the low overload settings often result in nuisance tripping when loads draw brief high phase currents.

Another unsatisfactory prior art approach utilizes ground current detectors and operates in anticipation that there will be no ground current under normal operating conditions, but during a phase to ground fault ground current will flow and be detected. This prior art approach is unsatisfactory in that it is difficult to predict the ground path and it is difficult to predict the magnitude of ground currents thereby complicating calibration of the sensing devices. Further, three-phase arcs will not be detected since no ground current is involved.

Still another unsatisfactory prior art approach utilizes phase current or voltage balance relays operating on the principle that the vector sum of currents in an electrical system is zero. In a three-phase system, three individual currents are passed through separate coils arranged to produce rotation in a moving armature, but when currents in the system are balanced the rotational effect is zero. When a single phase arc to ground occurs, some current flows into the ground circuit and the phase circuit currents no longer totals zero. Under these conditions the counteracting effect of one phase is removed, and the other two phases combine to produce a rotational effect which activates a protective device. This type of detecting equipment is relatively costly and delicate and will not detect three-phase arcs.

The instant invention overcomes the deficiencies of the prior art by providing a small wire extending through the duct housing and positioned so as to be in the path of arcs which may develop. This small wire is provided with a thermal capacity much less than that of the phase conductors or the enclosure, so that upon being subjected to an arc the small wire will vaporize in a brief period of time. This small wire is part of a circuit including appropriate relays and associated devices, as will be hereinafter explained, so that a break in the wire is sensed and remedial action taken to interrupt the flow of current supplying the arcing fault.

Accordingly a primary object of the instant invention is to provide novel means for detecting and removing arcing faults in bus ducts before such faults seriously damage the duct thereby simplifying repair and minimizing down time.

Another object is to provide novel means for reducing the danger of fires resulting from arcing faults in bus ducts.

Still another object is to provide an arcing fault detection means which includes a messenger wire that vaporizes when subjected to an arc.

A further object is to provide an arcing fault detection means which includes a messenger wire positioned to have a voltage induced therein by an arc.

These as well as other objects of this invention will become readily apparent after reading the following description of the accompanying drawings in which:

FIGURE 1 is a perspective showing a length of bus duct constructed in accordance with teachings of the instant invention.

FIGURE 2 is an end view of a bus duct section, in schematic form, showing the location of the sensing conductor and probable arc paths.

FIGURES 3, 4 and 5 are schematics showing different protective systems constructed in accordance with the instant invention and sensitive to arcing faults.

Now referring to the figures, bus duct 10 includes rectangular sheet metal housing 12 having flat elongated bus bars A, B, C and N disposed therein. Insulators, such as insulators 13, 14 based along a length of housing 12, maintain bus bars A, B, C and N in generally parallel insulating relationship. In order to tap power from duct section 10, the side walls of housing 12 are provided with a plurality of apertures 11 each normally closed by an openable cover 15. Bus bars A, B, C, N are insulation covered, except that the insulation is cut away in the vicinity of the housing apertures 11.

Extending from one end to the other of housing 12 is a messenger or sensing wire consisting of four sections 17a, 17b, 17c and 17d (FIGURE 2). Messenger wire sections 17a, 17b extend along opposite edges of bus bar A while messenger wires 17c, 17d extend along opposite edges of bus bar C and are maintained in operative positions by being cemented, in insulating relationship, to bus bars A and C. Naturally, messenger wire sections 17a, 17b, 17c, 17d are bent away from the bus bar edges in the vicinity of the housing apertures 11 so as not to interfere with the tapping of power from bus duct section 10.

As seen in FIGURE 2, the probable arc paths between bus bars are at the edges thereof, while arcs between the bus bars and housing 12 usually occur between the bus bar edges and housing 12. Considering that the bus bars A, B, C, N are connected to three-phase source 21 as shown in FIGURE 3, then bus bar N is grounded and bus bars A, B and C are connected to different phases of source 21. Under such circumstances, it has been found that an arcing fault which initiates between bus bar B and housing 12 will not persist for an appreciable length of time, but will convert instead to a phase to phase fault. Thus, it is seen that messenger wire sections 17a, 17b, 17c, 17d are so positioned that one of them will be subjected to the effects of phase to phase arcing faults and one of them will be subjected to arcing faults occuring between bus bars A or C and housing 12. For reasons which will hereinafter become apparent, messenger wire 17a–17d is so constructed that any portion thereof which is subjected to heat from an arc for a relatively short period of time will vaporize.

Now referring more particularly to FIGURE 3 which schematically illustrates bus duct run 25 whose bus bars A, B, C, N are electrically connected through the main contacts of circuit interrupter 26 to three-phase source of electrical energy 21. As is well known to the art, bus duct run 25 consists of a plurality of buse duct sections 10 connected end to end with the respective phase bus bars A, B, C, N of all bus duct sections 10 being series connected. In addition, the respective messenger wire sections 17a–17b of each of the bus duct sections in bus duct run 25 are serially connected. That is, each of the messenger wire sections 17a for all bus duct sections 10 are conneced in series as by jumpers (not shown) and in like manner correspondingly designated messenger wire sections of bus duct run 25 are serially connected.

In addition, at the end of the bus duct run 25 remote from circuit interrupter 26 jumper 27a electrically connects messenger wire portions 17a, 17b while jumper 27b electrically connects messenger wire portions 17c, 17d. The ends of messenger wire portions 17b, 17c closer to interrupter 26 are electrically connected by jumper 27c. Thus, it is seen that there is a complete series path through all of the messenger wire sections extending from point 28 at the end of messenger wire section 17a closer to circuit interrupter 26 to point 29 at the end of messenger wire section 17d closer to circuit interrupter 26.

Externally of bus duct run 25, points 28 and 29 are electrically connected through a series path consisting of secondary winding 31 of transformer 30 and operating coil 34 of actuator 33. Primary winding 32 of transformer 30 is connected to phase conductors B and C on the line side of circuit interrupter 26. Coil 34 when energized, maintains normally closed contacts 35 of actuator 33 in open circuit position. Contacts 35 are connected to trip means 36 of circuit interrupter 26. Trip means 36 is a shunt trip device for automatically operating the contacts of circuit interrupter 26 to open circuit position upon the occurrence of predetermined fault conditions. Although details of the energizing circuit for trip means 36 are not shown, to those skilled in the art it is sufficient for purposes of this application to state that with contacts 35 closed trip means 36 is energized to bring about opening of the main contacts of circuit interrupter 26.

Under normal operating conditions for the embodiment illustrated in FIGURE 3, a low value of current flows through messenger wire 17a–17d energizing coil 34 to maintain contacts 35 in the open position. When any portion of messenger wire 17a–17d vaporizes the energizing circuit for coil 34 is broken thereby deenergizing coil 34 to permit contacts 35 to close which in turn energizes trip means 36 to open the main contacts of circuit interrupter 26 thereby deenergizing the bus bars A, B, C, N of bus duct run 25 to remove power from the arcing fault.

In order to avoid difficulty in restoring service after normal service interruptions the embodiment of FIGURE 4 is provided. More particularly, with the embodiment of FIGURE 3 when service is restored after a loss of power to coil 34, closed contacts 35 may permit enough power to flow into trip means 36 to operate the latter before coil 34 operates contacts 35 to their open circuit position. To avoid this occurrence, normally closed contacts 35 are connected in series with relay coil 41 with the series combination being connected across secondary winding 31. Coil 41 operates normally open contacts 42 to open circuit position after a very short time delay. Contacts 42 are connected to trip means 36 to energize the latter upon closing of contacts 42.

During normal operation for the embodiment illustrated in FIGURE 4, coil 34 is energized so that contacts 35 are open deenergizing coil 41 so that contacts 42 are in their normally open position. Upon the occurrence of an arcing fault which vaporizes a portion of messenger wire 17a–17d the energizing circuit for coil 34 opens. This permits contacts 35 to close thereby energizing coil 41 so that after a very short time delay contacts 42 are closed to energize trip means 36 thereby opening circuit interrupter 26 to disconnect the bus bars A, B, C, N of bus duct run 25 from energizing source 21. Upon restoration of service after a normal service interruption, contact 35 will open before contact 42 can be closed so that trip means 36 will not be energized to cause unnecessary tripping of circuit interrupter 26.

The embodiment of FIGURE 5 utilizes the severing of messenger wire 51, as in the embodiments of FIGURES 3 and 4, as well as the voltage induced in messenger wire 51 upon the occurrence of an arcing fault to trip interrupter 26. This induced voltage is combined with the voltage of secondary winding 53 of transformer 52 to energize coil 56 of differential relay 55. The other coil 57 of relay 55 is connected across secondary winding 64 of transformer 63. Primary windings 54, 65 of transformers 52, 63, respectively, are connected to different phases of three-phase source 21. Differential relay 55 is so constructed that under normal operating conditions the effects of currents in coils 56, 57 counteract one another to maintain bridging contact 58 in the neutral position shown in FIGURE 5. When messenger wire 51 is severed, coil 56 is deenergized to unbalance the system permitting the effect of current through coil 57 to operate bridging contact 58 into shorting positions across conductors 61, 62 connected to trip means 36.

An arcing voltage impressed on messenger wire 51 will also induce a voltage therein, with this induced voltage acting on coil 56 to unbalance relay 55 resulting in operation of contact 58 to short conductors 61, 62 thereby operating trip means 36.

In the event of normal power interruption neither of the coils 56, 57 will function and upon restoration of power both coils 56, 57 will be energized simultaneously.

It is noted that coil 57 must not be connected in circuit with messenger wire 51 or the effects of coils 56, 57 will remain equal even upon the occurrence of an arc. By connecting the primaries of transformers 52, 63 to different phases the embodiment shown in FIGURE 5 will trip circuit interrupter 26 when one phase of the system is lost.

Thus, it is seen that the instant invention provides a novel inexpensive and reliable means for detecting arcing faults in bus duct. While the messenger wire sections have been described as being essentially straight, it is noted that these sections may be spiraled around the bus bars or take other forms depending upon the likely locations of arcing faults in a particular bus duct.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A bus duct system including an elongated housing, a plurality of bus bars extending along the length of said housing, means positioning said bus bars within said housing and insulated from each other, a circuit interrupter connected in circuit with said bus bars for connecting said bus bars to a source of electrical energy, said circuit interrupter including a tripping means which when actuated automatically causes said circuit interrupter to open, arcing fault detecting means to determine the presence of current arcs between said bus bars as well as current arcs between said bus bars and said housing; said arcing fault detecting means including a messenger wire disposed within said housing and extending along the length thereof, an actuating means connected to said tripping means, said actuating means connected in a circuit with said messenger wire and being energized when said messenger wire is subjected to an arcing fault, said actuating means upon energization thereof actuating said tripping means thereby opening said circuit interrupter.

2. The system as set forth in claim 1 in which the messenger wire is of relatively low thermal capacity so that portions of said messenger wire subjected to an arcing fault will vaporize and thereby interrupt the circuit between said messenger wire and said actuating means.

3. The system as set forth in claim 1 in which the circuit also includes normally open contacts and a relay coil for operating said contacts closed; said contacts interposed between said messenger wire and said actuating means.

4. The system as set forth in claim 3 in which the messenger wire and the relay coil are connected in electrical series combination.

5. The system as set forth in claim 3 in which there are electrical conductors connecting the contacts to the actuating means.

6. The system as set forth in claim 4 in which the circuit further includes additional normally open contacts and an additional relay coil for delayed closing of said additional contacts, said additional contacts interposed between said contacts and said actuating means.

7. The system as set forth in claim 6 in which the additional relay coil and the contacts are connected in another electrical series combination in parallel with said combination.

8. The system as set forth in claim 7 in which there are electrical conductors connecting the additional contacts to the actuating means.

9. The system as set forth in claim 1 in which there is a circuit between the messenger wire and the actuating means including a differential relay having a contact means normally in a neutral position, a first and a second relay coil for operating said contact means from said neutral position to an active position wherein said actuating means is energized, said circuit including an energizing part for said first coil and another energizing part for said second coil, said another energizing part including said messenger wire series connected to said second coil, said energizing part, said another energizing part and said coils proportioned so that said contact means is maintained in said neutral position in the absence of an arcing fault acting upon said messenger wire.

10. The system as set forth in claim 9 in which operation of said contact means by said first coil is in a first direction and operation of said contact means by said second coil is in a second direction opposite to said first direction, operation of said contact means in either said first or said second directions bringing said contact means to said active position.

References Cited

UNITED STATES PATENTS

| | | | |
|---|---|---|---|
| 2,350,601 | 6/1944 | Frank et al. | 174—84 |
| 3,335,324 | 8/1967 | Buckeridge | 317—18 |

MILTON O. HIRSHFIELD, *Primary Examiner.*

J. D. TRAMMELL, *Assistant Examiner.*